United States Patent
Kerin

(10) Patent No.: US 7,128,347 B2
(45) Date of Patent: Oct. 31, 2006

(54) PASSIVE TRANSMITTER FOR A QUICK CONNECTOR

(75) Inventor: Jim Kerin, Grosse Pointe Woods, MI (US)

(73) Assignee: TI Group Automotive Systems, LLC, Warren, MI (US)

( * ) Notice: Subject to any disclaimer, the term of this patent is extended or adjusted under 35 U.S.C. 154(b) by 217 days.

(21) Appl. No.: 10/991,973

(22) Filed: Nov. 18, 2004

(65) Prior Publication Data

US 2006/0103134 A1    May 18, 2006

(51) Int. Cl.
*F16L 37/00* (2006.01)
(52) U.S. Cl. ............................ 285/305; 285/82; 285/93
(58) Field of Classification Search .................. 285/82, 285/93, 305
See application file for complete search history.

(56) References Cited

U.S. PATENT DOCUMENTS

| | | | |
|---|---|---|---|
| 4,946,205 A | * | 8/1990 | Washizu ...................... 285/82 |
| 5,227,798 A | | 7/1993 | Hildebrand |
| 5,395,140 A | * | 3/1995 | Wiethorn ...................... 285/93 |
| 5,628,531 A | | 5/1997 | Rosenberg et al. |
| 5,683,117 A | * | 11/1997 | Corbett et al. ................ 285/24 |
| 5,829,880 A | * | 11/1998 | Diedrich ...................... 285/93 |

* cited by examiner

*Primary Examiner*—David Bochna
(74) *Attorney, Agent, or Firm*—Leydig, Voit & Mayer, Ltd.

(57) ABSTRACT

A quick connector coupling for forming a joint in a fluid line system. The quick connector coupling comprises a female connector body, a male member and a latch coupled to the connector body. The female connector body has slots formed therethrough and a bore extending from an end of the connector body. The male member extends through the end of the connector body and into the bore. The male member has a tubular surface and an annular upset. The upset has a diameter greater than the diameter of the tubular surface. The latch is in abutting relationship with the male member upset. The latch includes a passive transmitter.

21 Claims, 10 Drawing Sheets

PASSIVE TRANSMITTER FOR A QUICK CONNECTOR

BACKGROUND OF THE INVENTION

This invention relates to fluid line systems which include quick connector couplings, and more particularly to a quick connector coupling having a passive transmitter capable of providing verification that the coupling has been properly connected.

In automotive and other fields, quick connector couplings, which generally include a male member received and sealingly retained in a female connector body, are often utilized to provide a fluid connection between two components or conduits, thus establishing a fluid line between the two components. Use of quick connector couplings is advantageous in that a sealed and secured fluid line may be established with a minimum amount of time and expense.

A number of methods and mechanisms exist for securing the male member and female connector body of a quick connector coupling together.

One type of retention mechanism involves use of a retainer inserted through slots formed in the exterior of the connector body. Beams extending through the slots are poised between the male member upset and the rearward surfaces defining the slots, thereby preventing disconnection of the coupling. Due to the physical appearance of such retainers, they are referred to in the trade as "horseshoe" retainers.

Another type of retention mechanism involves the use of a retainer disposed within the connector body. The retainer has load-bearing members extending between a radial face formed within the connector body and an enlarged upset formed on the male member, thereby securing the male member within the connector body.

DETAILED DESCRIPTION OF THE DRAWINGS

Figure 1:
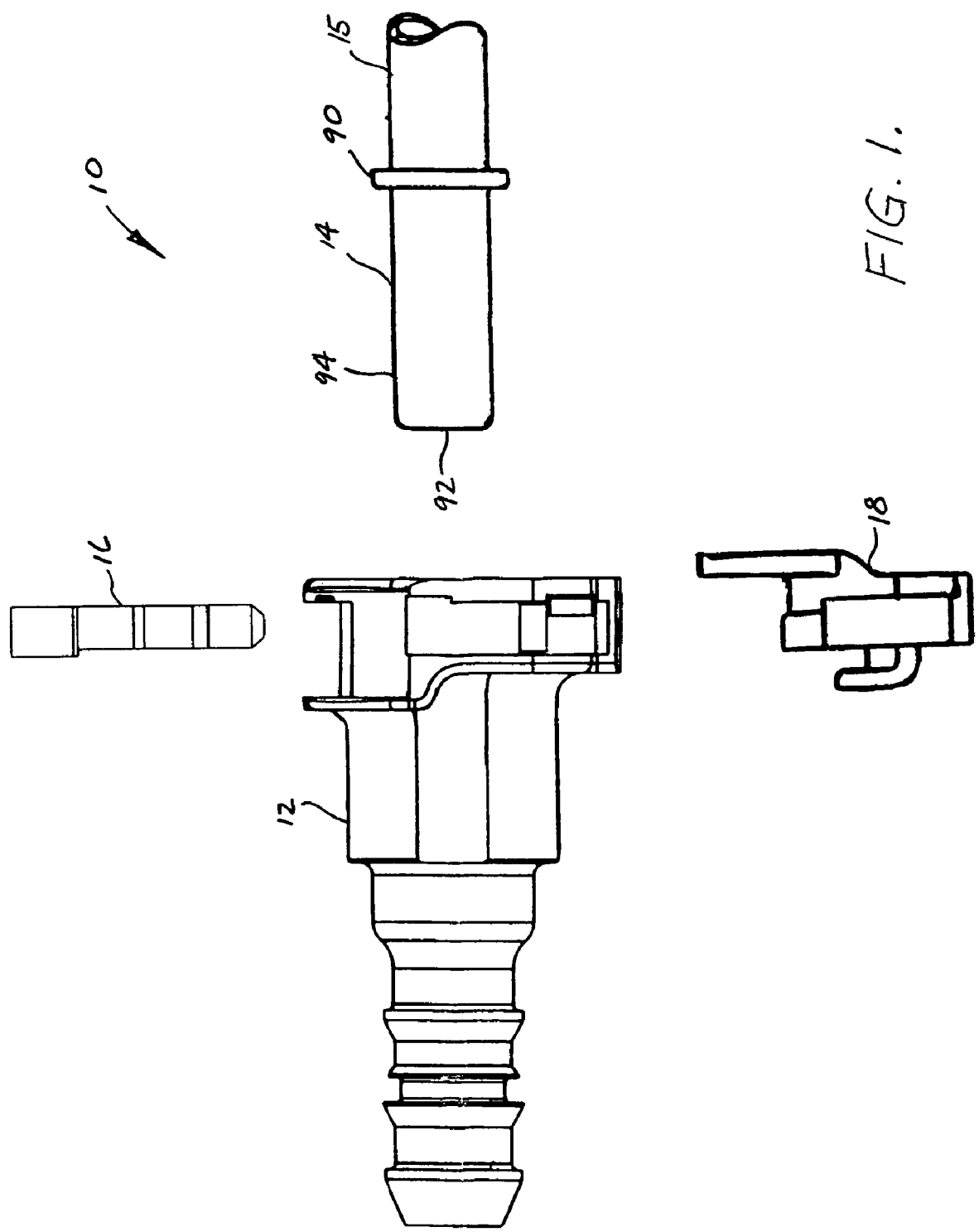
FIG. 1 is an exploded view of a first embodiment of a quick connector coupling according to the present invention.

FIG. 1 illustrates a quick connector coupling 10 formed in a fluid line. The coupling 10 is comprised of a generally cylindrical female connector body 12 and a male member 14 secured together by a primary retainer 16 and a secondary latch 18. It should be understood that although latch 18 is referred to as "secondary" and shown in conjunction with another retainer, applications are envisioned in which it would be possible or even preferable to utilize latch 18 alone, without another "primary" retainer. The male member 14 is formed at an end of a hollow tube 15 which forms a part of a fluid line system. In use, the female connector body 12 is connected to a hose (not shown) which is also a part of the fluid line system. The female connector body 12 and the male member 14 are connectable to form a permanent, but severable, joint in the fluid line.

Figure 2:
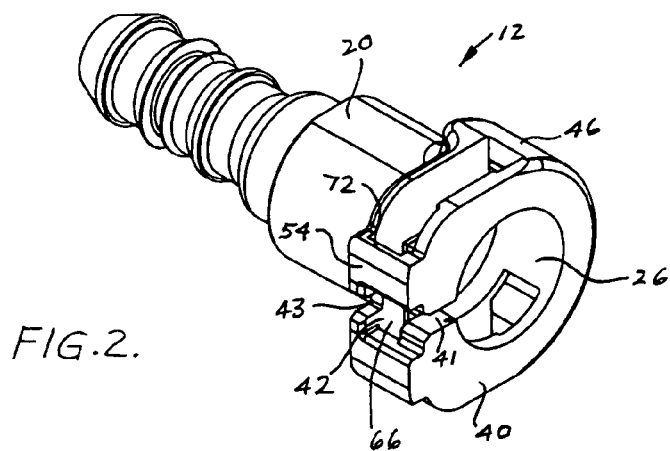
FIG. 2 is a perspective view of the female connector body of FIG. 1.
Figure 3:
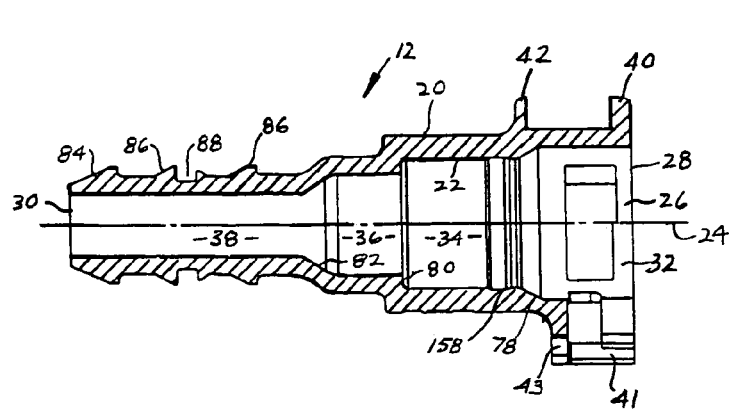
FIG. 3 is a side sectional view of the connector body of FIG. 1.
Figure 4:
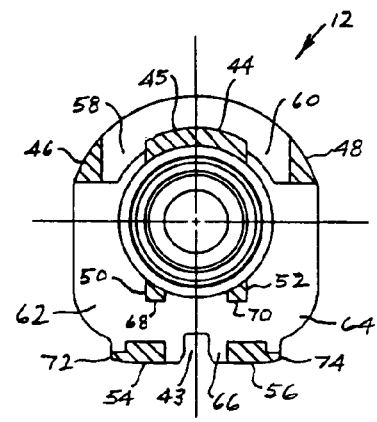
FIG. 4 is a front sectional view of the connector body of FIG. 1, taken through the retainer housing section.

The connector body 12 is illustrated in detail in FIGS. 2–4. The connector body 12 is defined by a generally cylindrical, stepped exterior wall 20 and a generally cylindrical, stepped interior wall 22. The connector body 12 is centered about an axis 24, and is preferably made of a plastic material, such as nylon. The interior wall 22 defines a through bore 26. The bore 26 extends completely through the connector body 12, from a larger diameter, entrance or male member reception end 28, to a smaller diameter, hose connection end 30.

Variations in the diameter of interior wall 22 of connector body 12 divide bore 26 into four distinct sections. Moving axially inward from the male member reception end 28 to the hose connector end 30, they are: retainer housing section 32, seal chamber 34, tube end receptacle 36, and fluid passageway 38.

The retainer housing section 32 is adjacent to the male member reception end 28. It is defined by a C-shaped outer rim 40 connected to an inner rim 42 by a top support member 44, two side support members 46,48, two center support members 50,52, and two bottom support members 54,56. An outer rim slot 41 is defined at the bottom of the C-shaped outer rim 40. A notch 43 is defined at the bottom of the inner rim 42. The spaces between the top support member 44 and the two side support members 46,48 define two top slots 58,60. The spaces between the two side support members 46,48 and bottom support members 54,56 define two side slots 62,64. The space between the two bottom support members 54,56 defines a bottom slot 66. The top slots 58,60 receive and position the primary retainer 16 transversely to the central axis 24 of the connector body 12. The side slots 62,64 and the bottom slot 66 receive and position the secondary latch 18 transversely to central axis 24 of the connector body. The top support member 44 defines a curved upper surface 45. Each of the center support member 50,52 defines a locking shoulder 68,70. A locking ridge 72,74 extends laterally from the outer edge of each bottom support member 54,56.

The seal chamber 34 is formed axially inward of the retainer housing section 32. It is defined by a reduced diameter portion of interior wall 22, relative to the retainer housing section 32, extending axially inward from a conical shoulder 78 to a radial shoulder 80. The seal chamber 34 is provided to house sealing elements to form a fluid seal between the connector body 12 and the male member 14.

The tube end receptacle 36 is formed axially inward of the seal chamber 34. It is defined by a reduced diameter portion of interior wall 22, relative to seal chamber 34, which extends axially inward from the small diameter end of radial shoulder 80 to a conical shoulder 82. The tube end receptacle 36 is provided to receive an open end of the male member 14.

The fluid passageway 38 is defined by the smallest diameter portion of interior wall 22. It leads from the small diameter end of conical shoulder 82 to hose connection end 30. The portion of exterior wall 20 surrounding fluid passageway 38 is configured to facilitate connection to another component in the fluid line. The illustrated connector body 12, for example, is specially formed for connection to a flexible hose. A conical nose 84 is formed adjacent to end 30 to facilitate insertion into a flexible hose, and ramped barbs 86 are formed outward of nose 84 to retain the hose on the connector body. A groove 88 is defined to house an exterior O-ring seal, if desired.

As illustrated in FIG. 1, the male member 14 is formed at the end of a rigid tube 15. It includes a radially enlarged upset 90 formed a given distance from an open tube end 92. The tube end 92 can be rounded or tapered to make insertion of the male member 14 into the connector body 12 less difficult. A smooth, cylindrical sealing surface 94 extends between the upset 90 and the tube end 92. The outer diameter of sealing surface 94 should be such that the end of male member 14 fits snugly within the tube end receptacle 36.

Figure 5:
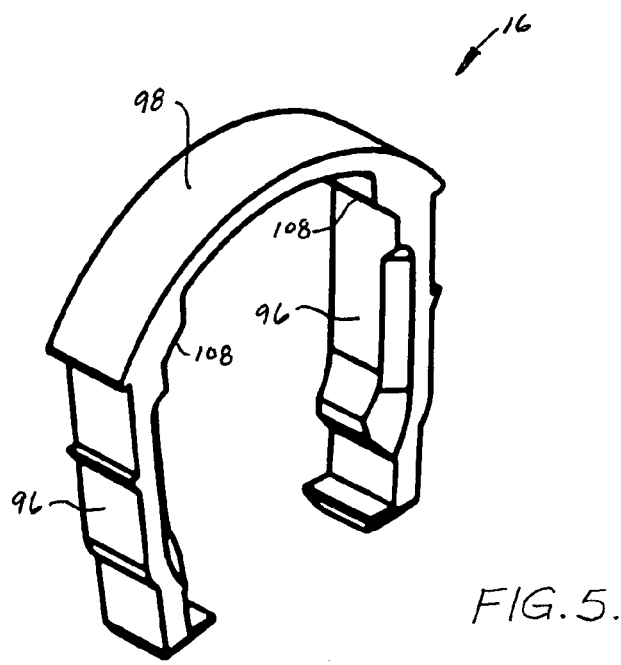
FIG. 5 is a perspective view of the primary retainer of FIG. 1.
Figure 6:
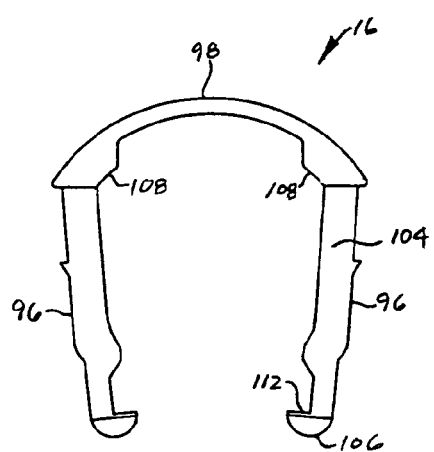
FIG. 6 is a front view of the primary retainer FIG. 1.
Figure 7:
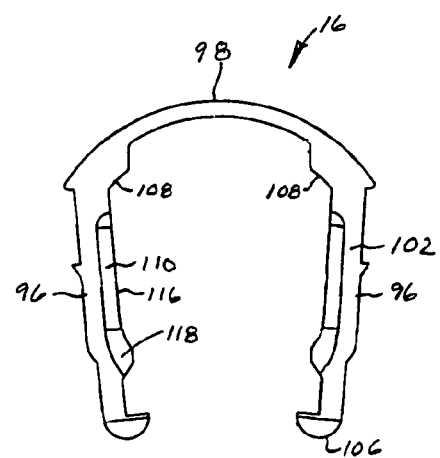
FIG. 7 is a rear view of the primary retainer of FIG. 1.

The primary "horse-shoe" type retainer 16 is illustrated in detail in FIGS. 5–7. It is preferably made of a resilient, flexible material, such as plastic. The primary retainer 16, which extends through the top slots 58,60 of retainer housing section 32, is demountably coupled to the connector body 12.

The primary retainer 16 includes a pair of elongated, generally parallel retention beams 96 extending from, and joined at one end by, a cross member 98. The cross member 98 provides a separation between the retention beams 96 approximately equal to the non-upset outer diameter of the male member 14. The retention beams 96 have an axial width approximately equal to, but slightly less than (to allow clearance), the axial width of the top slots 58,60. The lateral width of the retention beams 96 is significantly less than the lateral width of the top slots 58,60, in order to allow outward expansion of the retention beams 96 (to permit male member insertion and release).

Figure 8:
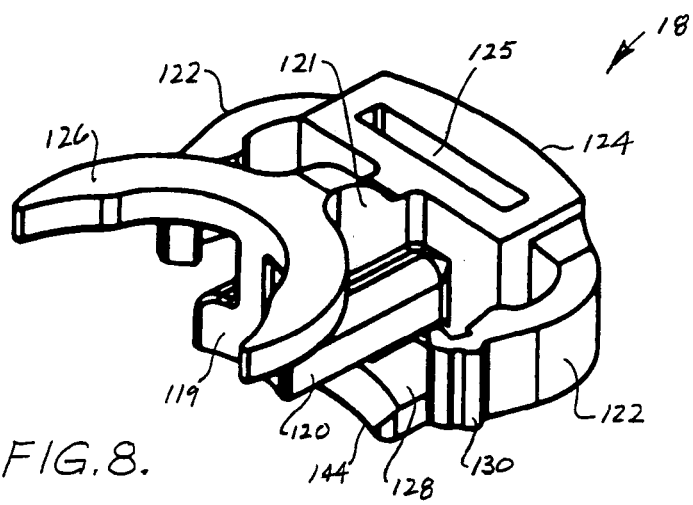
FIG. 8 is a perspective view of the secondary latch of FIG. 1.

The cross member 98 has an axial width substantially greater than that of the retention beams 96. As illustrated in FIG. 8, the cross member 98 is axially aligned with the front faces 102 of the retention beams 96, but extends axially beyond the rear faces 104 of the retention beams 96.

Each retention beam 96 includes a latch 106 formed at an end remote from the cross member 98, a release ramp 108, and a sloping lead area 110 formed on the front face 102 between the latch 106 and the cross member 98. When the primary retainer 16 is fully inserted into the connector body 12, the latches 106 lock the primary retainer 16 into position relative to the connector body 12. Latching edges 112, defined by the latches 106, engage the locking shoulders 68,70, defined by the center support members 50,52 of the connector body 12, to lock the primary retainer 16 in place.

The release ramps 108 are defined on the underside of the cross member 98. When assembled, the release ramp 108 rest just above the curved upper surface 45 of the top support member 44 of the connector body 12. If pressure is applied to the cross member 98 to press the primary retainer 16 further into the connector body 12, the release ramps 108 contact and slide or cam against the top support member 44. Consequently, the retention beams 96 spread apart, allowing release of the male member 14.

The lead areas 110 slope radially and axially inward from the front face 102 of each retention beam, and terminate approximately midway between the front face 102 and the rear face 104. The spacing between the lead areas 110 is at its greatest adjacent the front face 102. Here, the spacing is approximately equal to the diameter of the upset 90 formed on the male member 14. At the rear edges 116 of the lead areas 110, the spacing between the lead areas 110 is approximately equal to the (non-upset) outer diameter of the male member 14. The portions of the lead areas 110 closer to the latches 106 curve inwardly at 118 to match the annular profile of the male member upset 90. This assists in guidance and centering of the male member 14 through the connector body 12.

Figure 9:
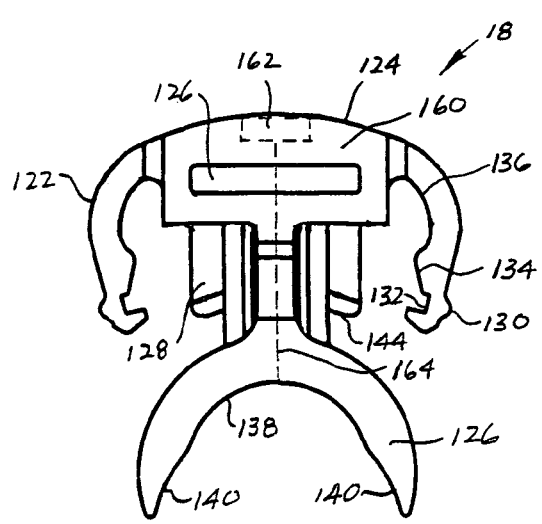
FIG. 9 is a rear view of the secondary latch of FIG. 1.
Figure 10:
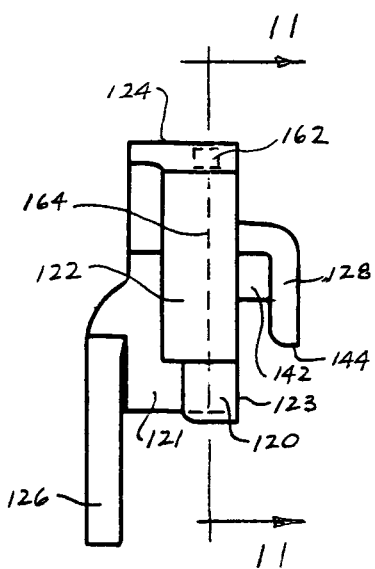
FIG. 10 is a side view of the secondary latch of FIG. 1.

The secondary latch 18 is illustrated in detail in FIGS. 8–10. The secondary latch 18 includes a plastic molded portion 160 and a passive transmitter 162. The plastic molded portion 160 of the secondary latch 18 includes a retainer beam 119, and a pair of elongated, generally parallel catch beams 122 joined by a main body portion 124.

Figure 14:
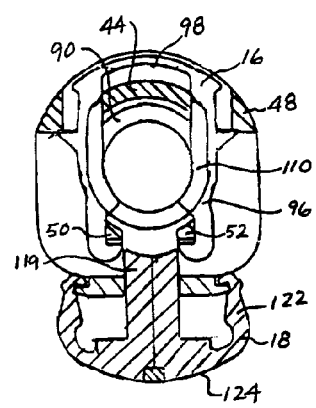
FIG. 14 is a sectional view of the coupling of FIG. 13, taken through line 14—14.
Figure 15:
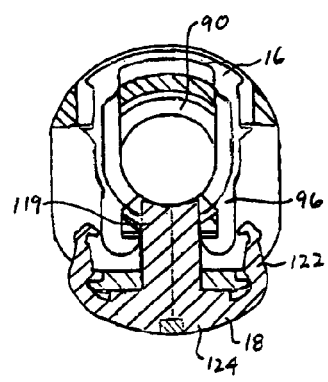
FIG. 15 is a sectional view of the coupling of FIG. 1, with the male member properly inserted into the connector body and the secondary latch in the latched position.

The main body portion 124 defines a rectangular shaped notch 125. The notch 125 is shaped to allow a knifed edge having a rectangular shaped cross-section, such as the end of a screw drive, to be inserted therein to provide the leverage necessary to pry the secondary latch 18 from the latched position (as illustrated in FIG. 15) to the non-latched position (as illustrated in FIG. 14.) Extending axially from the rear of the retainer beam 119 is a tube verifier 126. Extending axially from the front of the main body portion is a retaining clip 128.

The retainer beam 119 includes a laterally enlarged portion 120 and a narrowed portion 121. The lateral width of the enlarged portion 120 is slightly less than the lateral width of the bottom slot 66 of the connector body 12. The lateral width of the narrowed portion 121 is slightly less than the lateral width of the outer rim slot 41. The enlarged portion 120 defines an abutment surface 123 adapted for abutment with the upset 90 of the male member 14. The radially inner surface of the retainer beam 119 is curved to match the curvature of the outer surface of the tube forming the male member 14.

Each catch beam 122 includes a hook 130 formed at an end remote from the main body portion 124. Notches 132, defined by the hooks 130, engage the locking ridges 72,74, defined by the bottom support members 54,56 to secure the secondary latch 18 to the connector body 12 when the secondary latch is in an unlatched positioned. Located between the hooks 130 and the main body portion 124, the inner surface of each catch beam 122 defines a ramped surface 134 and a laterally enlarged surface 136. The distance between the ramped surfaces 134 of the two catch beams is smaller than the distance between the locking ridges 72,74. The distance between the laterally enlarged surfaces 136 of the two catch beams is approximately equal to the distance between the locking ridges 72,74. Furthermore, the narrowest distance between the inner surfaces of the catch beams 122 is slightly greater than the distance between the outer surfaces of the retention beams 96 of the primary retainer 16. The axial width of the catch beams 122 is approximately equal to the axial width of the retention beams 96.

The tube verifier 126 is generally moon shaped. The radially inner surface of the tube verifier 126 has a first curved surface 138 and a second curved surface 140. The first curved surface 138 is curved to match to curvature of the outer surface of the tube forming the male member 14. The second curved surface 140 is curved to match the curvature of the outer surface of the upset 90.

The retaining clip 128 extends axially from the front of the main body portion 124. A rib 142 connects the front surface of the retaining rim 28 to the rear surface of the main body portion 124. The lateral width of the rib 142 is slightly smaller than the lateral width of the notch 43 of the inner rim 42. The axial length of the rib 142 is slight larger than the axial thickness of the inner rim 42. An edge 144 is defined at the radially inward edge of the retaining clip 128. The curvature of the edge 144 matches the curvature of the portion of the exterior wall 20 surrounding the seal chamber 34. The curvature of the edge 144 is curved to allow upward pressure to release secondary latch into unlatched position and servicing of male member.

Figure 11:
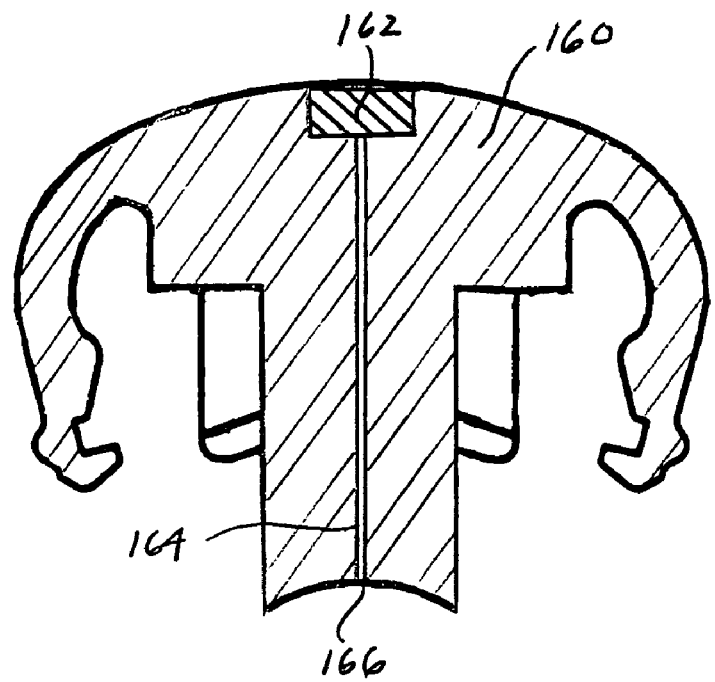
FIG. 11 is a rear sectional rear view of the secondary latch of FIG. 9, taken through line 11—11.

As illustrated in FIGS. 9–11, the passive transmitter 162 is located in the top of the main body portion 124. The passive transmitter 162 requires no power supply. An example of such a passive transmitter is described in U.S. Pat. No. 5,227,798, to Hildebrand, which is herein incorporated by reference. This type of passive transmitter is able to react to change in distance, strain, pressure, and other environmental factors. For the particular embodiment illustrated in FIG. 1, the passive transmitter 162 is used to sense change in pressure. A probe 164 is connected to the transmitter 162. The probe 164 extends from the radially inner surface of the retainer beam 119 to the transmitter 162. The terminal end 166 of the probe 164 is able to sense a change in pressure at the radially inner surface of the retainer beam 119.

The transmitter 162 can be embedded in the top of the main body portion 124 by molding the main body portion 124 directly around the transmitter 162. For this overmolded transmitter 162, the probe 164 is also overmolded into the retainer beam 119 during the process of molding the plastic portion 160 of the secondary latch 18. For this embodiment in which the transmitter 162 and the probe 164 are overmolded into the plastic portion 160, the transmitter 162 and the probe 164 must be able to tolerate the heat experienced during the molding process.

Alternatively, the transmitter 162 can be situated in a cavity defined on the top surface of the main body portion 124. A bore extends from the cavity to the radially inner surface of the retainer beam 119. The cavity is formed as part of the process of molding the plastic portion 160 of the secondary latch 18. The transmitter 162 is bonded or mechanically fastened to the main body portion 124. The probe 164 is inserted into the bore defined in the retainer beam 119.

Figure 12:
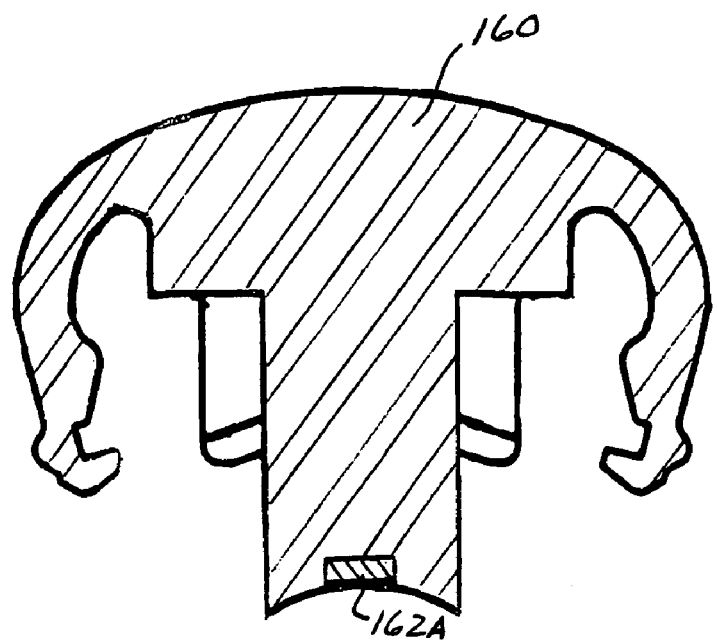
FIG. 12 is a rear sectional rear view of a secondary latch for use with the coupling of FIG. 1 with the transmitter located at an alternative location.

FIG. 12 illustrates a secondary latch for use with the coupling of FIG. 1 with the transmitter located at an alternative location. Rather than locating the transmitter at the top of the main body portion 124 and using a probe to sense a change in pressure at the radially inner surface of the retainer beam 119, the transmitter 162A is located immediately radially outward of the radially inner surface of the retainer beam 119. The transmitter 162A can be embedded near the radially inner surface of the retainer beam 119 by overmolding the retainer beam 119 directly around the transmitter 162A. Alternatively the transmitter 162A can be situated in a cavity defined on the radially inner surface of the retainer beam 119.

The process for connecting the quick connector coupling is as follows. The primary retainer 16 is attached to the connector body 12. The retention beams 96 of the primary retainer 16 are inserted through the top slots 58,60 of the retainer housing section 32. The primary retainer 16 is oriented such that the cross member 98 and the release ramps 108 are located above the top support member 44, and the lead areas 110 of the retention beams 96 face the male member reception end 28.

Insertion of the retention beams 96 through the top slots 58,60 is facilitated by applying a downward force on the cross member 98. For the purpose of describing the present invention, the term "downward force" is defined as a force that is applied toward the connector body 12. An increase in downward force is necessary when the retention beams 96 contact the sides of center support members 50,52. Applying sufficient downward force, the rounded ends of the retention beams 96 slide against the sides of the center support members 50,52, spreading the retention beams 96 apart and allowing the retention beams 96 to pass by the center support members 50,52. When the retention beams 96 clear the center support members 50,52, the retention beams 96 spring inward with the latching edges 112 positioned under the locking shoulders 68,70 of the bottom support 78 to secure the primary retainer 16 to connector body 12. A properly attached primary retainer 16 is illustrated in FIGS. 14 and 15. In the attached position, the retention beams 96 of the primary retainer 16 are approximately perpendicular to the axis 24 of the bore 26 when viewed from the side (see FIGS. 1 and 13). When viewed from the front or the rear, the retention beams 96 are approximately equally spaced from the axis 24 of the bore 26 (see FIGS. 14 and 15).

With the primary retainer 16 properly attached to the connector body 12, the male member 14 is then inserted into the connector body 12. The sealing surface 94 of the male member 14 passes between retention beams 96 and into seal chamber 34 with little or no resistance, as the spacing between the retention beams 96 is approximately equal to the non-upset outer diameter of the male member 14. Resistance to insertion occurs when the upset 90 of the male member 14 contacts the retention beams 96. The lead areas 110 of the retention beams 96 permit passage of the upset 90 between the retention beams upon applying sufficient axial inward force. As the upset 90 passes between retention beams 96, it rides along the lead areas 110 and flexes the retention beams 96 radially outward. Once the upset 90 has passed the retention beams, the retention beams 96 spring back into place behind the upset 90 to a locked position. The rear faces 104 of the retention beams 96 abut the upset to prevent subsequent inadvertant withdrawal of the male member 14 from the connector body 12.

Release of the male member 14 from a locked position can be achieved by exerting a downward force on the cross member 98. Downward force on the cross member 98 causes the release ramps 108 to contact the curved upper surface 45 of the top support member 44 of connector body 12. The release ramps 108 slide or cam against the top support member 44, causing the retention beams 96 to spread laterally apart as application of downward force continues. Eventually, the retention beams 96 will be spread apart a distance sufficient to allow passage of the upset 90 between the retention beams 96. The male member 14 may then be withdrawn from the connector body 12. Upon withdrawal of the member 14 from the connector body 12 and relaxation of primary retainer 16, the primary retainer 16 reassumes to its normal installed position.

Figure 13:
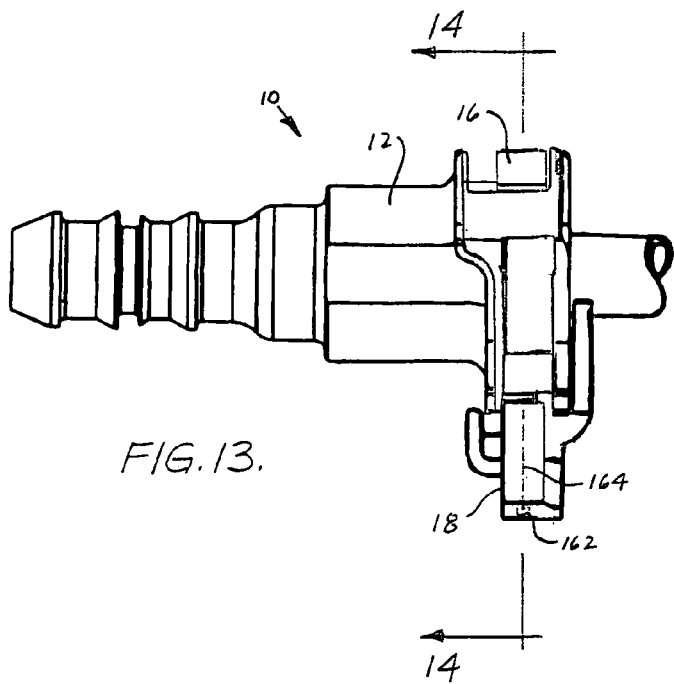
FIG. 13 is a side view of the coupling of FIG. 1, with the primary retainer in the locked position and the secondary latch in the unlatched position.
Figure 16:
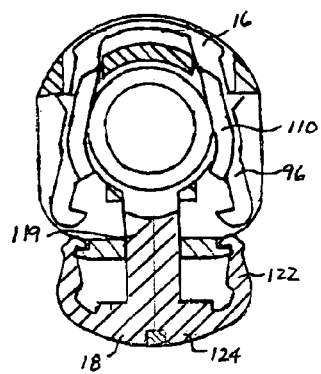
FIG. 16 is a sectional view of the coupling of FIG. 1, with the male member not inserted sufficiently into the connector body and the secondary latch in the unlatched position.
Figure 17:
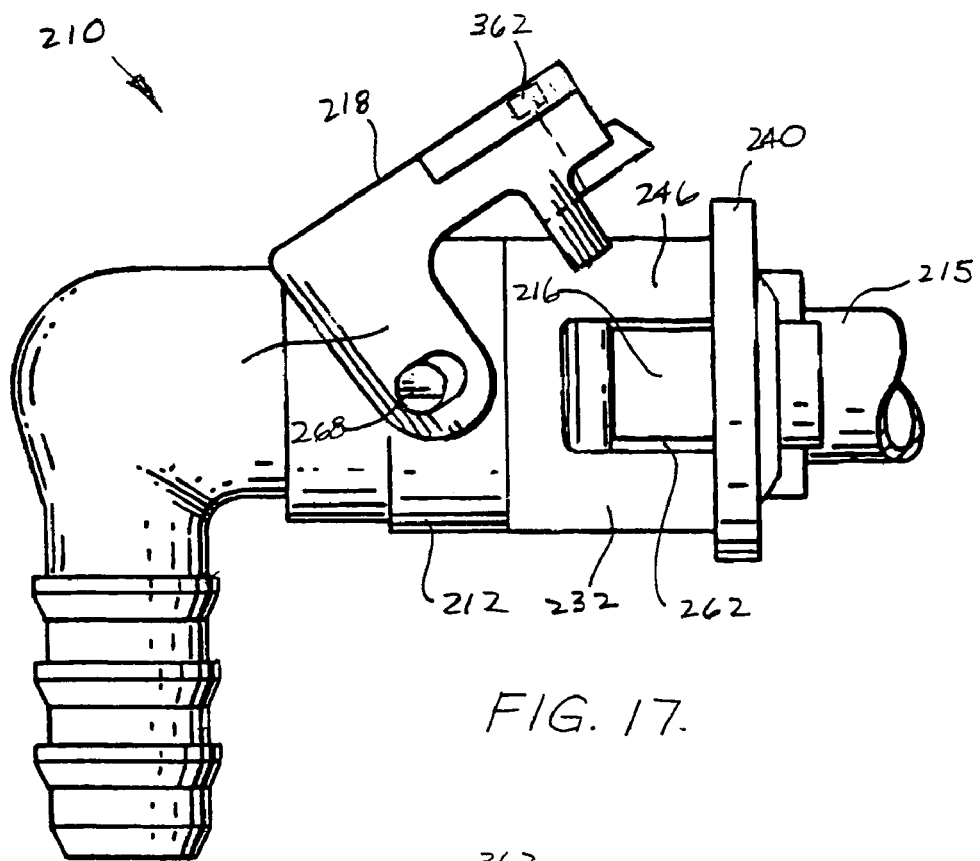
FIG. 17 is a side view of a second embodiment of a quick connector coupling according to the present invention showing a secondary latch in the unlatched position.
Figure 18:
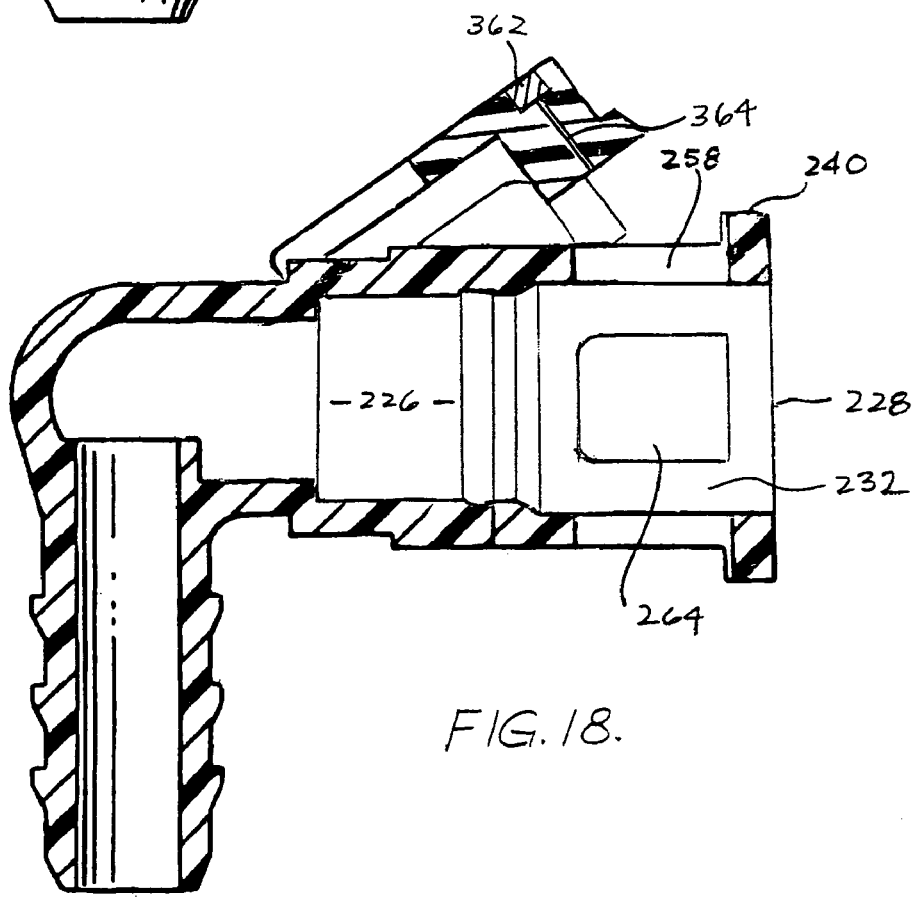
FIG. 18 is a side sectional view of the connector body of FIG. 17.
Figure 19:
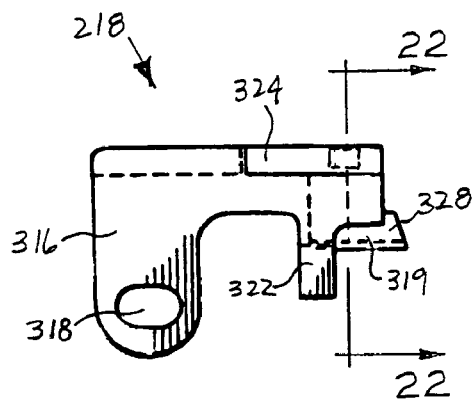
FIG. 19 is a side view of the secondary latch of FIG. 17.
Figure 20:
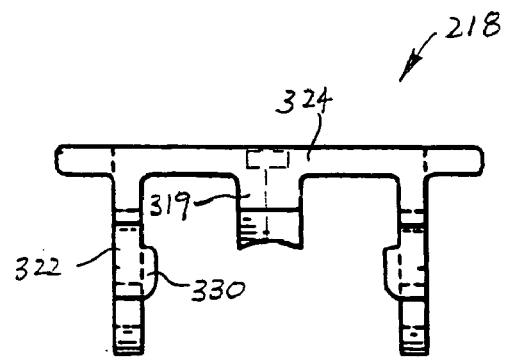
FIG. 20 is a front view of the secondary latch of FIG. 17.
Figure 21:
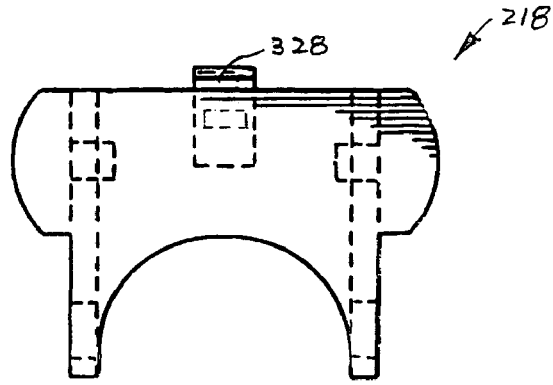
FIG. 21 is a top view of the secondary latch of FIG. 17.
Figure 22:
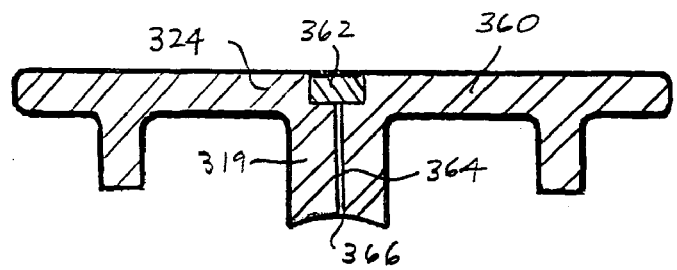
FIG. 22 is a front section view of the secondary latch of FIG. 19, taken along line 22—22.

The coupling is completed by positioning the secondary latch 18 from a non-latched position, in which the locking ridges 72,74 are located within the notches 132, (as illustrated by FIGS. 13 and 14) to a latched position (as illustrated by FIG. 15). To position the secondary latch 18 to the latched position, a downward force is applied to the main body portion 124. With sufficient downward force, the ramped surfaces 134 of the catch beams 122 slide against the sides of the locking ridges 72,74, spreading the catch beams 122 apart and allowing the catch beams to pass by the bottom support members 54,56. With the male member 14 properly inserted in the connector body 12, as illustrated in FIGS. 16 and 17, the secondary latch is able to move to a position where a section of the catch beams 122 of the secondary latch 18 are located laterally outward of the retention beams 96 of the primary retainer 16. At the same time, the retainer beam 119 and the tube verifier 126 are moved radially inward toward the male member 14, and the retaining clip 128 is moved radially inward toward the exterior wall 20 surrounding the seal chamber 34.

When the secondary latch 18 is fully inserted into the connector body 12, the locking ridges 72,74 surpass the ramped surfaces 134 of the catch beams 122 and are situated between the laterally enlarged surfaces 136. The catch beams 122 of the secondary latch 18 spring laterally inward to the latched position as illustrated in FIG. 17. The catch beams 122 of the secondary latch 18 are approximately perpendicular to the axis 24 of the bore 26 when viewed from the side (see FIGS. 1 and 13). When viewed from the front or the rear, the catch beams 122 are approximately equally spaced from the axis 24 of the bore 26 (see FIGS. 14 and 15). In the latched position, a portion of each catch beam 122 of the secondary latch 18 is positioned laterally outward of the corresponding retention beam 96 of the primary retainer 16. The position of the catch beams 122 relative to the retention beams 96 prevents the retention beams 96 from inadvertently moving laterally outward to release the male member 14 from the locked position. In the latched position, the rear surface of the retainer beam 119 is in axial abutting relationship with the upset 90 of the male member 14. This axial abutting relationship between the retainer beam 119 and the upset 90 provides the secondary latch 18 with the secondary latch feature to retain the male member 14 in the connector body 12 should the primary retainer 16 fail.

When the male member 14 has been properly inserted into the connector body 12, such that the upset 90 has surpassed the retention beams 96 of the primary retainer 16, the radially inwardly surface of the retainer verifier 119 is able to move radially inward between the retention beams of the primary retainer and into a latched position where the radially inner surface of the retaining beam abuts the outer surface of the tube forming the male member. This ability of the secondary latch 18 to move radially inward to the latched position provides visual verification to the user that the male member 14 has been properly inserted into the connector body 12.

In addition to providing the visual verification as noted above, the secondary latch 18 of the present invention is also able to send a signal to a receiver to provide verification that the male member 14 has been properly inserted into the connector body 12. Since the radially inner surface of the retainer beam 119 is shaped to match the outer surface of the tube 15; upon inserting the secondary latch 18 in the latched position, the middle of the radially inner surface of the retainer beam 119 abuts the outer surface of the tube 15. This abutment of the retainer beam 119 with the tube 15 causes the pressure to change at the middle of the radially inner surface where the terminal end 166 of the probe 164 is situated. This change in pressure causes the resonant frequence transmitted by the transmitter 162 to change. A receiver (not shown) is positioned near where the secondary latch 18 is inserted into the connector body 12. The receiver receives the signal from the transmitter 162 and sends a signal to a process unit (not shown) capable of acknowledging that there is a change in frequency. The processing unit is then able to send a signal to a display unit (not shown) to provide notification that the coupling 10 has been properly connected. The processing unit is also able to send a signal to a recorder (not shown) which is able to make a record that coupling 10 has been properly connected.

FIG. 16 illustrates a situation when the male member 14 was not properly inserted into the connector body 12. In such a situation, the male member 14 has not been sufficiently inserted into the connector body 12 for the upset 90 to surpass the retention beams 96 of the primary retainer 16. With the retention beams 96 still spread apart, the catch beams 122 of the secondary latch 18 are unable to be inserted radially inward into the connector body 12 since the ends of the catch beams 122 will abut the still spread apart retention beams 96 of the primary retainer 16. Furthermore, with the male member 14 insufficiently inserted into the connector body 12, the upset 90 is located immediately radially inward of the retainer beam 119 of the secondary latch 18. Abutment of the radially inwardly surface of the retainer beam 119 with the radially outer surface of the upset 90 also prevents the secondary latch from being able to be inserted radially inward into the connector body 12. This inability of the secondary latch 18 from moving radially inward to the latched position provides visual verification to the user that the male member 14 has not been sufficiently inserted into the connector body 12.

Furthermore, the curvature of the radially inner surface of the retainer beam 119 is not the same as the curvature of the outer surface of the upset 90. The inner diameter of the radially inner surface of the retainer beam 119 is smaller than the diameter of the outer surface of the upset 90. With this mismatch in the curvatures of the radially inner surface of the retainer beam 119 and the outer surface of the upset 90, only the edges of the retainer beam 119 are able to contact the upset 90. Therefore, although the edges of the retainer beam 119 may abut the upset 90 in situations wherein the male member 14 has not been not properly inserted into the connector body 12, the middle of the retainer beam 119 does not contact the upset 90. In this situation, the pressure at the middle of the retainer beam 119, where the terminal end 166 of the probe 164 is located, does not change. This lack of change in pressure at the middle of the radially inner surface of the retainer beam 119 does not change the frequency being sent by the transmitter 162. Hence, the processing unit will not receive a signal to acknowledge that the coupling 10 was properly connected.

A second embodiment of a quick connector coupling according to the present invention is illustrated in FIGS. 17–25. The quick connector coupling 210 of the second embodiment is essentially the same as the quick connector coupling described in commonly assigned U.S. Pat. No. 5,628,531, incorporated herein by reference, with the exception of a transmitter situated in the plastic portion of the secondary latch for providing a signal to a receiver verifying that the male member has been properly inserted into the connector. The quick connector coupling 210 includes a male member 214 connectable with a hollow female connector body 212.

The male member 214 is formed at an end of a hollow, rigid tube 215 which forms a part of a fluid line system. The male member 214 includes an annular flange or upset 290 formed at a given distance from the end of the male member.

The female connector body 212 is hollow and defines a bore 226. It is made of a plastic material; preferably nylon. An enlarged retainer housing section 232 is formed at one end of the connector body 212. The retainer housing section 232 has an entrance 228 defined by a radial annular rim 240. A pair of one-hundred eighty (180) degree circumferentially displaced, rectangular windows 262,264 are formed through the connector body 212 and extend from rim 240 away from entrance 228.

A slot 258 is formed through the retainer housing section 232 of the connector body 212. The slot 258 is narrower than, and is circumferentially spaced ninety (90) degrees from, the windows 262,264. Curved cam surfaces 246,248 extend circumferentially between the slot 258 and the windows 262,264. Two cylindrical mounting posts 268 are formed on opposite sides of the exterior of connector body 212.

Figure 26:
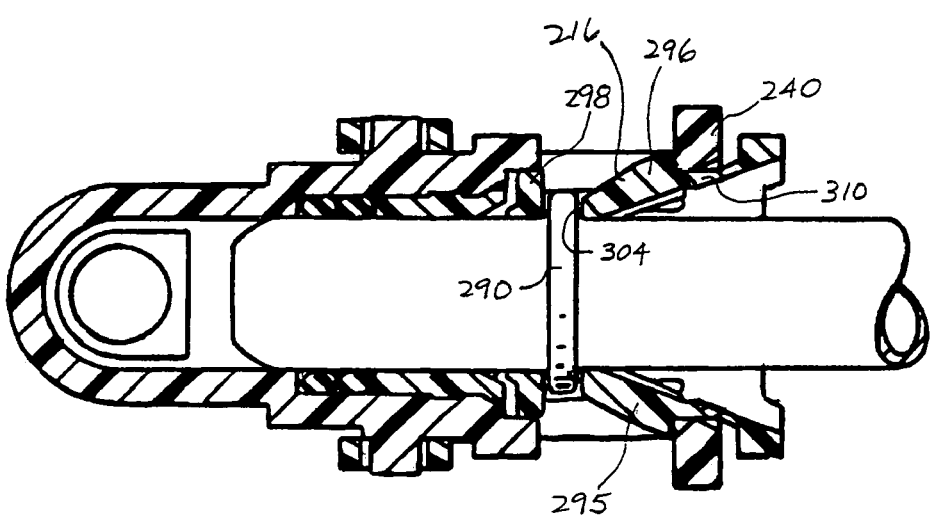
FIG. 26 is a top sectional view of the coupling of FIG. 17, with the male member properly inserted into the connector body and the secondary latch in the latched position.

A retainer 216 is disposed in the retainer housing section 232 of connector body 212. The retainer 216 secures the male member 214 within connector body 212. The retainer 216 is made of plastic, preferably nylon. As illustrated in FIG. 26, the retainer 216 includes two support structures 295 extending outward from a base ring 298. The support structures 295 are integrally joined to, and extend outward from the base ring 298. Each support structure 295 includes two parallel support beams (not shown) extending from base ring 298 towards entrance 228. The support beams are joined at their ends distal from base ring 298 by semi-circular cross beams 310. Cross beams 310 are adapted to be nested within the interior of entrance rim 240. The radial spacing between cross beams 310 is slightly greater than the outside diameter of upset 290. Hence, the male member 214, the upset 290 and all, can pass between the cross beams 310 without resistance.

A retention beam 296 is centrally mounted on each cross beam 310, straddled by the support beams of support structure 295. Retention beams 296 extend inwardly from the cross beams 310 at a converging angle, terminating in an abutment surface 304. The abutment surface 304 is adapted be in an abutting relationship with the upset of the male member upon the male member sufficiently and properly inserted into the retainer. The axial separation between the abutment surface 304 and the base ring 298 must be at least as great as the axial width of the upset 290. The radial spacing between abutting surfaces 304 is less than the diameter of male member upset 290. Thus, the retention beams 296 must be forced radially outwardly to permit passage of upset 290.

A secondary latch 218 is attached to the exterior of connector body 212. It should be understood that although the latch 218 is referred to as "secondary" and shown in conjunction with another retainer, applications are envisioned in which it would be possible or even preferable to utilize the latch 218 alone, without another "primary" retainer. The secondary latch 218 includes a plastic molded portion 360 and a passive transmitter 362. The plastic molded portion 360 of the secondary latch 218 includes a main body portion 324. Two legs 316 extends from the side edges of body portion 324. Each leg 316 defines an oblong hole 318 to receive the corresponding post 268 formed on connector body 212. Two opposing catch beams 322 extends from the body portion 324. Inwardly-extending hooks 330 are formed at the ends of catch beams.

A rectangular retainer beam 319 is formed at the underside of main body portion 324. The retainer beam 319 defines an outward extending clip 328.

As illustrated in FIGS. 17–22, the passive transmitter 362 is located at the top of the main body portion 324. A probe 364 is connected to the transmitter 362. The probe extends from the radially inner surface of the retainer beam 319 to the transmitter 362. The terminal end 366 of the probe 364 is able to sense a change in pressure at the radially inner surface of the retainer beam 319.

The transmitter 362 can be embedded in the top of the main body portion 324 by molding the main body portion 324 directly around the transmitter 362. For this overmolded transmitter 362, the probe 364 is also overmolded into the retainer beam 319 during the process of molding the plastic portion 360 of the secondary latch 318. For this embodiment in which the transmitter 362 and the probe 364 are overmolded into the plastic portion 360, the transmitter 362 and the probe 364 must be able to tolerate the heat experienced during the molding process.

Alternatively, the transmitter 362 can be situated in a cavity defined on the top surface of the main body portion 324. A bore extends from the cavity to the radially inner surface of the retainer beam 319. The cavity is formed as part of the process of molding the plastic portion of the secondary latch. The transmitter 362 is bonded or mechanically fastened to the main body portion 324. The probe 364 is inserted into the bore defined in the retainer beam 319.

Figure 23:
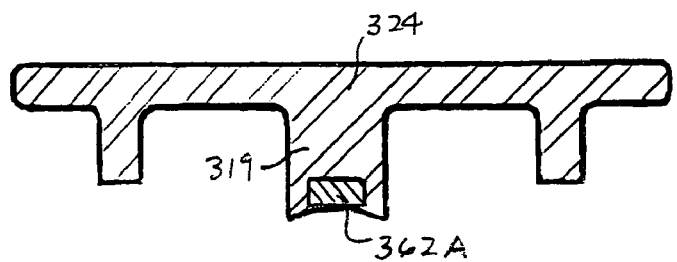
FIG. 23 is a front sectional rear view of a secondary latch for use with the coupling of FIG. 17 with the transmitter located at an alternative location.

FIG. 23 illustrates a secondary latch for use with the coupling of FIG. 17 with the transmitter located at an alternative location. Rather than locating the transmitter at the top of the main body portion 324 and using a probe to sense a change in pressure at the radially inner surface of the retainer beam 319, the transmitter 362A is located immediately radially outward of the radially inner surface of the retainer beam 319. The transmitter 362A can be embedded near the radially inner surface of the retainer beam 319 by overmolding the retainer beam 319 directly around the transmitter 362A. Alternatively the transmitter 362A can be situated in a cavity defined on the radially inner surface of the retainer beam 319.

The retainer 216, the secondary latch 218 and the male member 214 are assembled into and onto, respectively, connector body 212 in the manner disclosed in the U.S. Pat. No. 5,628,531.

Figure 25:
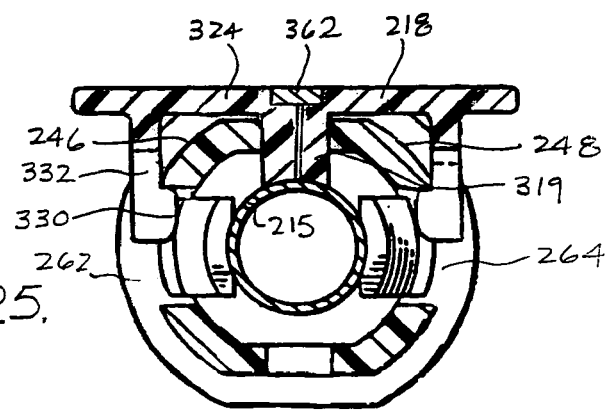
FIG. 25 is a front sectional view of the coupling of FIG. 17, taken through the retainer housing section, with the male member properly inserted into connector body and the secondary latch in the latched position.

After the male member 214 has been properly inserted into the retainer 216 and connector body 212 assembly, the secondary latch 218 is next moved to a latched position. The secondary latch is pivoted about its hinge on the posts 268 of the connector body 214 until the hooks 330 of the catch beams 332 come into contact with the curved cam surfaces 246,248 defined on the exterior of the connector body 212 between the windows 262,264 and the slot 258. The spacing between the hooks 330 is less than the diameter of the curved cam surface 246,248. Thus, pressure must be applied to the topside of main body portion 324 of the latch 218 to cause the hooks 330 to cam against the cam surfaces 246,248 and spread the catch beams 332 outwardly. If sufficient pressure is applied, the hooks 330 enter the windows 262,264 to hold the latch 218 in a latched position as illustrated in FIG. 25.

Figure 24:
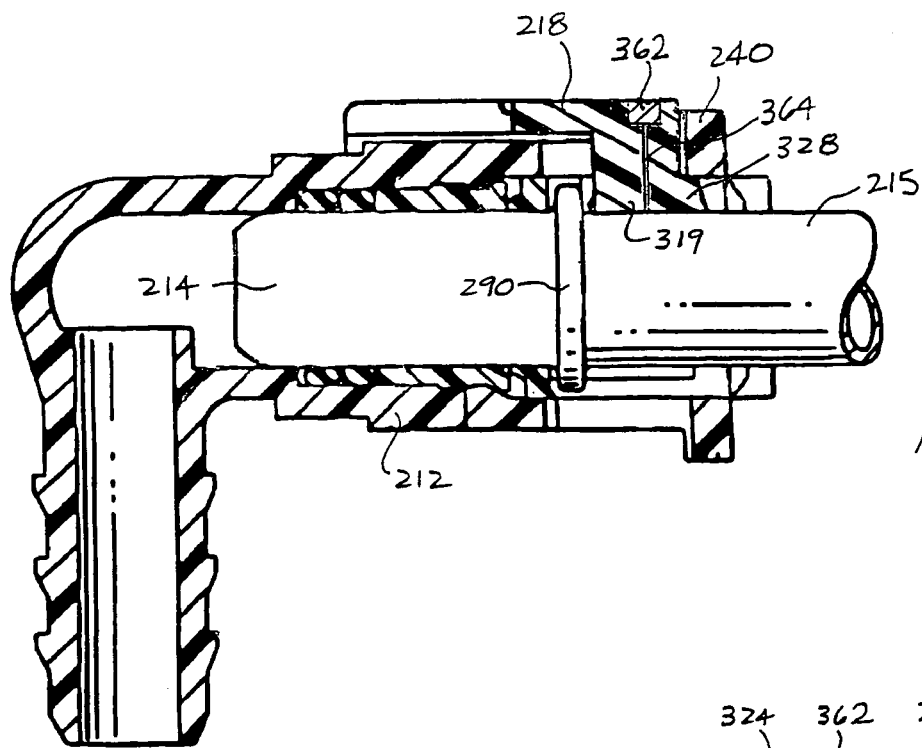
FIG. 24 is a side sectional view of the coupling of FIG. 17, with the male member properly inserted into the connector body and the secondary latch in the latched position.

At the same time the hooks 330 are entering the windows 262,264, the retainer beam 319 enters into the axially extending slot 258 defined in connector body 212. As illustrated in FIG. 24, the inwardly facing edge of the retainer beam 319 is in abutting relationship with the upset 290 to provide a secondary means to prevent unintentional withdrawal of the male member 214. Also, a portion of the clip 328 extends underneath the rim 240, which assists the hooks 330 in preventing the latch 218 from unintentionally moving out of the latched position. This ability of the secondary latch 218 to pivot to the latched position provides visual verification to the user that the male member 214 has been properly inserted into the connector body 212.

In addition to providing the visual verification as noted above, the secondary latch 218 of the present invention is also able to send a signal to a receiver to provide verification that the male member 214 has been properly inserted into the connector body 212. Since the radially inner surface of the retainer beam 319 is shaped to match the outer surface of the tube 215, as shown in FIG. 25; upon inserting the secondary latch 218 in the latched position, the middle of the radially inner surface of the retainer beam 319 abuts the outer surface of the tube 215. This abutment of the retainer beam 319 with the tube 215 causes the pressure to change at the middle of the radially inner surface where the terminal end 366 of the probe 364 is situated. This change in pressure causes the resonant frequence transmitted by the transmitter 362 to change. A receiver (not shown) is positioned near where the secondary latch 218 is inserted into the connector body 212. The receiver receives the signal from the transmitter 362 and sends a signal to a process unit (not shown) capable of acknowledging that there is a change in frequency. The processing unit is then able to send a signal to a display unit (not shown) to provide notification that the coupling 210 has been properly connected. The processing unit is also able to send a signal to a recorder (not shown) which is able to make a record that coupling 210 has been properly connected.

Figure 27:
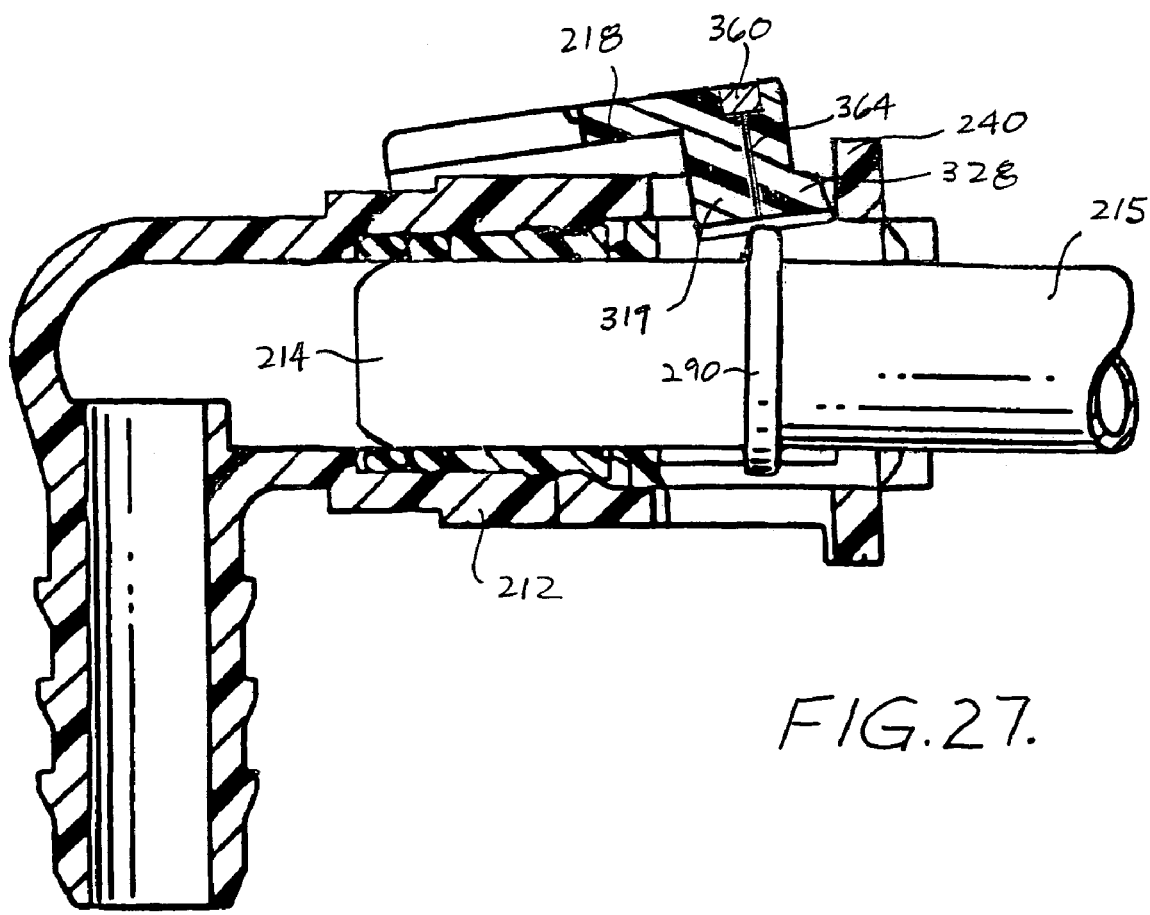
FIG. 27 is a side sectional view of the coupling of FIG. 17, with the male member not inserted sufficiently into the connector body and the secondary latch in the unlatched position.
Figure 28:
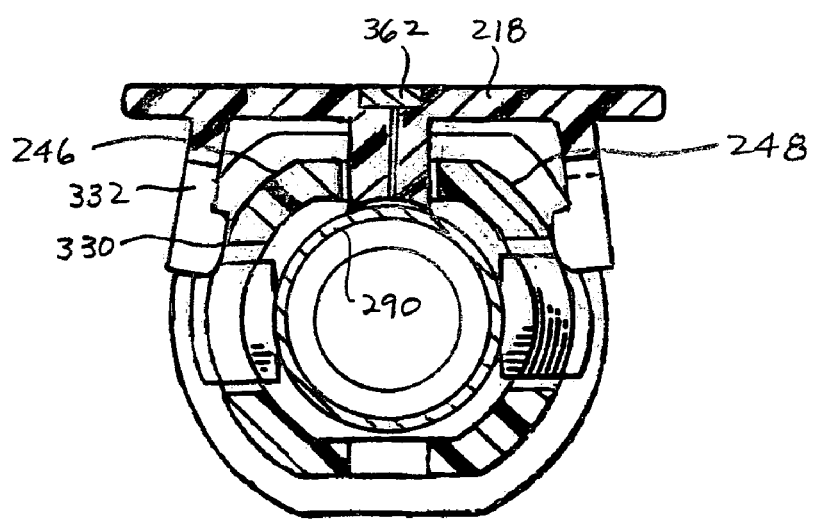
FIG. 28 is a front sectional view of the coupling of FIG. 17, taken through the retainer housing section, with the male member not inserted sufficiently into the connector body and the secondary latch in the latched position.

FIGS. 27–28 illustrate a situation wherein the male member 214 was not properly inserted into the connector body 212. In such a situation, the male member 214 has not been sufficiently inserted into the connector body 212 for the upset 290 to surpass the retention beams 296 of the retainer 216. With the male member 214 insufficiently inserted into the connector body 212, the upset 290 is located immediately radially inward of the retainer beam 319 of the secondary latch 318. Abutment of the radially inwardly surface of the retainer beam 319 with the radially outer surface of the upset 290 prevents the secondary latch from being able to be inserted into the connector body 212. This inability of the secondary latch 218 from privoting to the latched position provides visual verification to the user that the male member 214 has not been sufficiently inserted into the connector body 212.

Furthermore, as shown in FIG. 28, the curvature of the radially inner surface of the retainer beam 319 is not the same as the curvature of the outer surface of the upset 290. The inner diameter of the radially inner surface of the retainer beam 319 is smaller than the diameter of the outer surface of the upset 290. With this mismatch in the curvatures of the radially inner surface of the retainer beam 319 and the outer surface of the upset 290, only the edges of the retainer beam 319 are able to contact the upset 290. Therefore, although the edges of the retainer beam 319 may abut the upset 290 in situations wherein the male member 214 has not been not properly inserted into the connector body 212, the middle of the retainer beam 319 does not contact the upset 290. In this situation, the pressure at the middle of the retainer beam 319, where the terminal end 366 of the probe 364 is located, does not change. This lack of change in pressure at the middle of the radially inner surface of the retainer beam 319 does not change the frequency being sent by the transmitter 362. Hence, the processing unit will not receive a signal to acknowledge that the coupling 210 was properly connected.

Various features of the present invention have been explained with reference to the embodiment shown and described. It must be understood, however, that modification may be made without departing from the spirit of the invention and scope of the following claims.

The invention claimed is:

1. A quick connector coupling for forming a joint in a fluid line system comprising:
   a female connector body having slots formed therethrough and a bore extending from an end of said connector body;
   a male member extending through said end of said connector body and into said bore, said male member having a tubular surface and an annular upset, said upset having a diameter greater than the diameter of said tubular surface;
   a latch coupled to said connector body and disposed in abutting relationship with said male member upset, and said latch includes a passive transmitter.

2. The coupling as claimed in claim 1 further comprising a retainer coupled to said connector body.

3. The coupling as claimed in claim 2 wherein said retainer includes two retention beams in abutting relationship with said male member upset.

4. The coupling as claimed in claim 3 wherein said latch includes two catch beams, each catch beam has a portion positioned laterally outward of one of said retention beams.

5. The coupling as claimed in claim 4 wherein said catch beams are approximately perpendicular to the axis of said bore when viewed from the side.

6. The coupling as claimed in claim 4 wherein said catch beams are able to be positioned laterally outward of one of said retention beams only if the retention beams are in the locked position.

7. The coupling as claimed in claim 4 wherein said retention beams are movable from a locked position to a released position in which said retention beams are spaced apart a distance greater than said upset diameter if the catch beams of said secondary latch are not positioned laterally outward of said retention beams.

8. A coupling as claimed in claim 7 wherein said primary retainer further includes a release cooperable with said connector body to move said retention beams from said locked position to said release position.

9. The coupling as claimed in claim 4 wherein said catch beams prevent said retention beams from moving from said locked position to a released position in which said retention beams are spaced apart a distance greater than said upset.

10. The coupling as claimed in claim 1 wherein said latch further includes a retainer beam disposed in axial abutting relationship with said male member upset.

11. The coupling as claimed in claim 10 wherein a radially inner surface of said retainer beam is in radial abutting relationship with said tubular surface of said male member.

12. The coupling as claimed in claim 10 wherein edges of of the radially inner surface of said beam abut the radially outer surface of said male member upset if the male member has not been sufficiently inserted into the connector body.

13. The coupling as claimed in claim 10 wherein said beam is movable to the axial abutting relationship with said male member upset only if the male member has been sufficiently inserted into the connector body.

14. The coupling as claimed in claim 10 wherein said latch includes a probe extending from said passive transmitter to or near the radially inner surface of the retainer beam.

15. The coupling as claimed in claim 14 wherein said retainer beam has a radially inner curved surface between opposite edges that has a diameter smaller than the diameter of said upset and said probe is located intermediate said edges.

16. The coupling as claimed in claim 10 wherein said passive transmitter is located at or near the radially inner surface of the retainer beam.

17. The coupling as claimed in claim 16 wherein said retainer beam has a radially inner curved surface between opposite edges that has a diameter smaller than the diameter of said upset and said passive transmitter is located intermediate said edges.

18. The coupling as claimed in claim 1 wherein said latch further includes a rim, said rim axially positions said secondary latch relative to said connector body.

19. The coupling as claimed in claim 1 wherein said latch is pivotably mounted to the connector body.

20. The coupling as claimed in claim 1 wherein said latch includes a plastic portion molded around said transmitter.

21. The coupling as claimed in claim 20 wherein the plastic is nylon.

\* \* \* \* \*